United States Patent [19]

Broomfield et al.

[11] Patent Number: 4,780,986
[45] Date of Patent: Nov. 1, 1988

[54] APPARATUS FOR THE COLLECTION AND DISPOSAL OF INSECTS

[76] Inventors: Jack M. Broomfield; Douglas W. Broomfield, both of 940 Siskiyou Dr., Menlo Park, Calif. 94025

[21] Appl. No.: 116,464

[22] Filed: Nov. 3, 1987

[51] Int. Cl.$^4$ .............................................. A01M 5/02
[52] U.S. Cl. ........................................ 43/139; 15/352; 15/415 R
[58] Field of Search ................... 43/139; 15/330, 344, 15/415 R, 352

[56] References Cited

U.S. PATENT DOCUMENTS

| | | | |
|---|---|---|---|
| 454,720 | 6/1891 | Dexter | 43/139 |
| 3,330,063 | 7/1967 | Lockwood | 43/139 |
| 4,011,624 | 3/1977 | Proett | 15/415 R |
| 4,074,458 | 2/1978 | Catlett | 43/139 |
| 4,141,173 | 2/1979 | Weimert | 43/139 |
| 4,175,352 | 11/1979 | Catlett | 43/139 |
| 4,209,875 | 7/1980 | Pugh et al. | 15/344 |
| 4,279,095 | 7/1981 | Aasen | 43/139 |
| 4,290,165 | 9/1981 | Hiramatsu et al. | 15/330 |
| 4,449,319 | 5/1984 | Garcia | 43/139 |
| 4,451,951 | 6/1984 | Satoh | 15/330 |
| 4,485,583 | 12/1984 | Planty | 43/139 |
| 4,488,331 | 12/1984 | Ward | 43/139 |
| 4,607,451 | 8/1986 | Jarecki | 43/139 |
| 4,630,329 | 12/1986 | Shores | 43/139 |

Primary Examiner—Gene P. Crosby
Attorney, Agent, or Firm—Timothy H. P. Richardson

[57] ABSTRACT

Apparatus, especially hand-held, battery-powered apparatus, for the collection and disposal of insects through an open end thereof. In one embodiment, which may be in the form of an attachment for a conventional battery-powered vacuum cleaner, the insect is retained on a screen mounted on a carriage which is movable between rear and front positions within a housing. The front position is close to the open end, and after collecting the insect with the carriage in the rear position, the carriage is moved to the front position, where it is brought to an abrupt stop so that the insect is ejected from the apparatus. The ejection of the insect can alternatively or additionally be assisted by reversing the direction of the air flow through the open end.

19 Claims, 4 Drawing Sheets

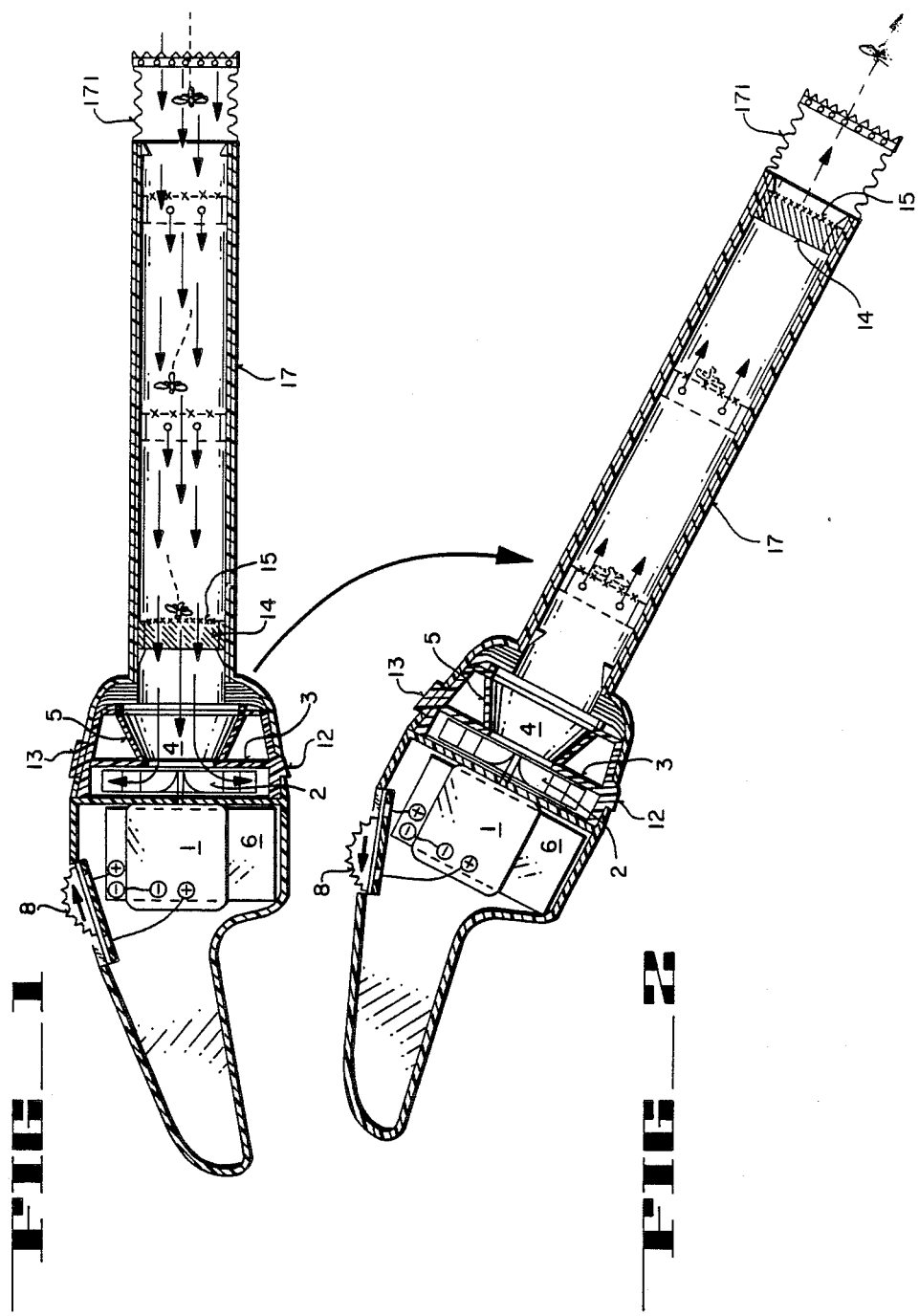

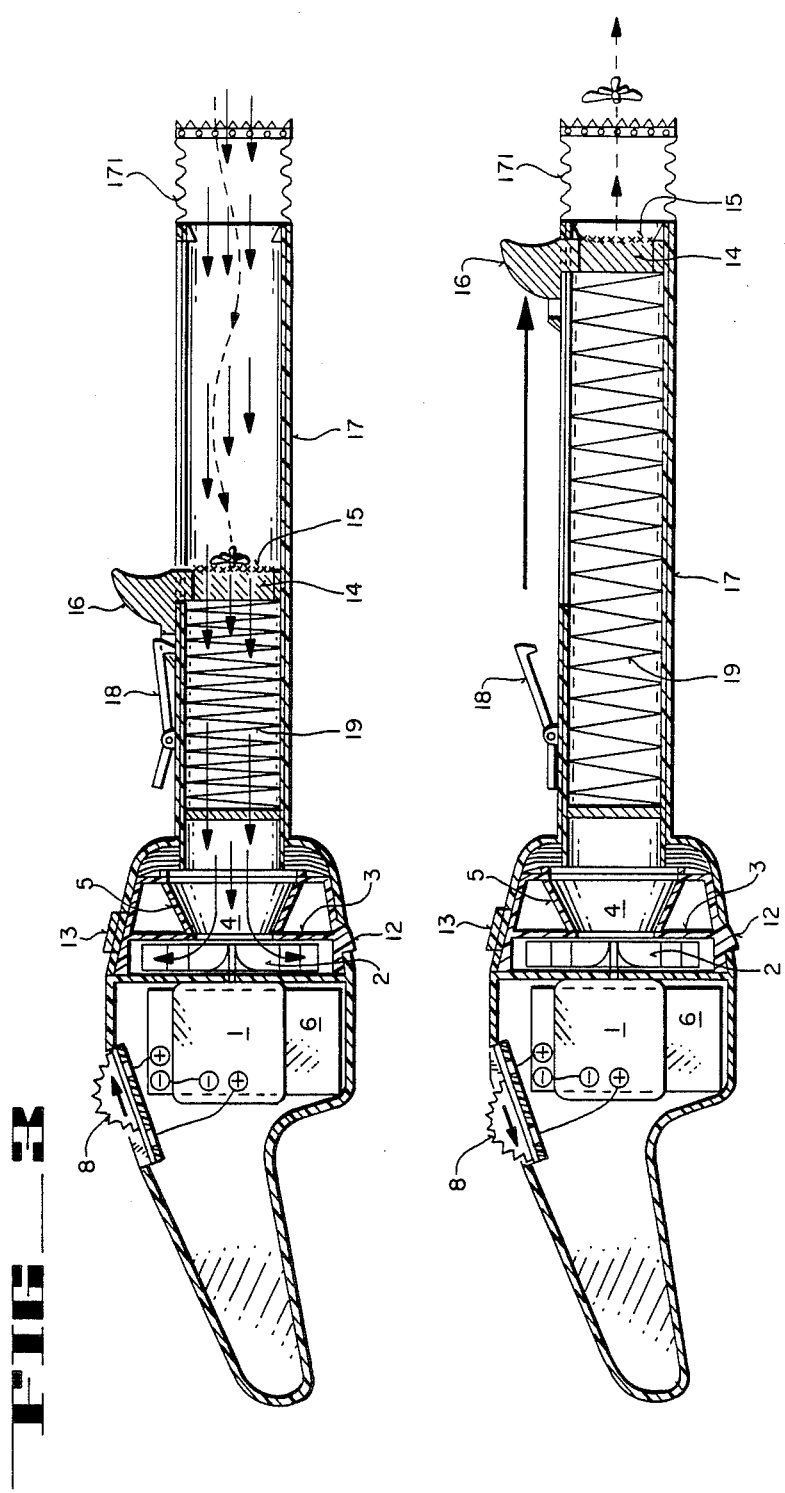

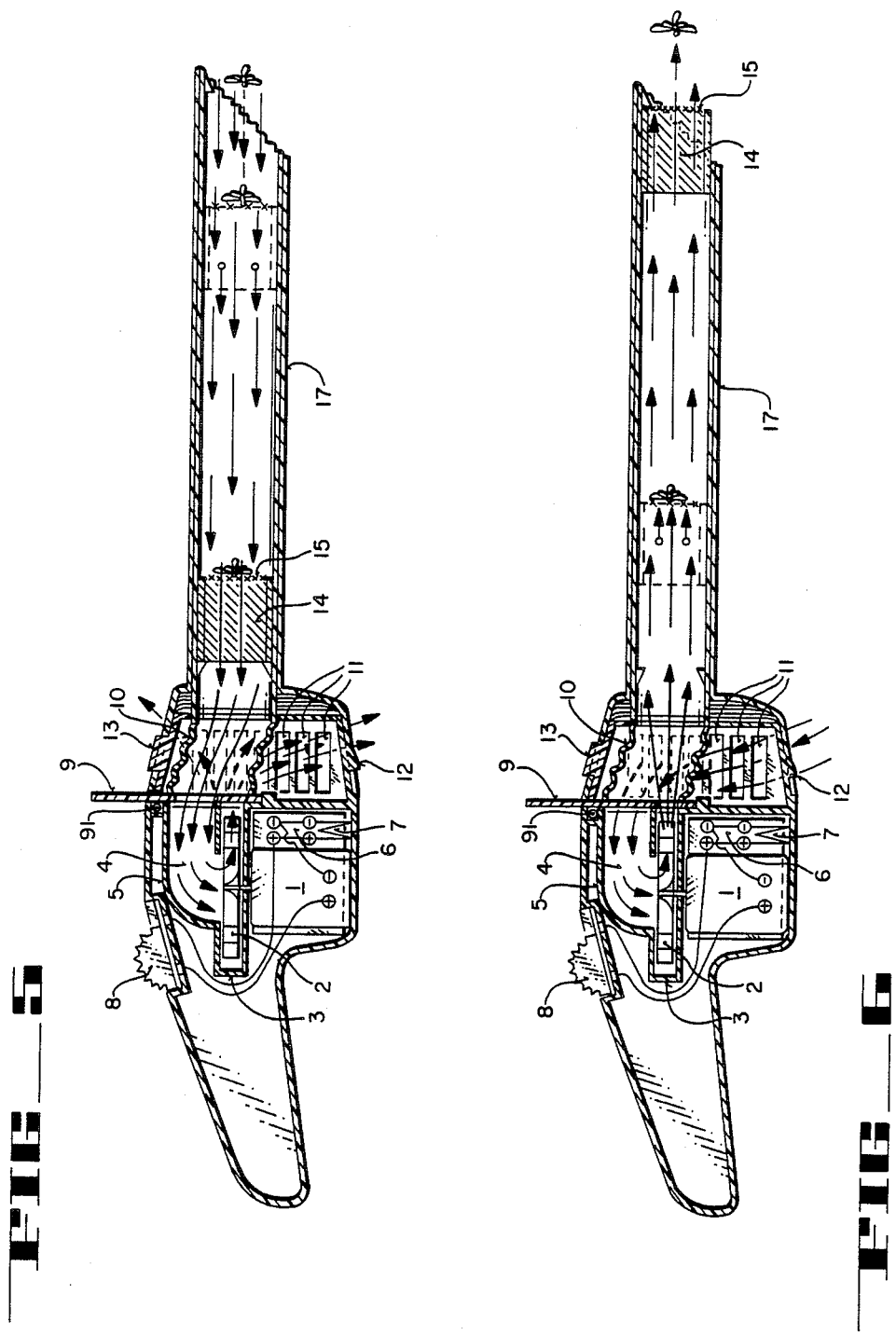

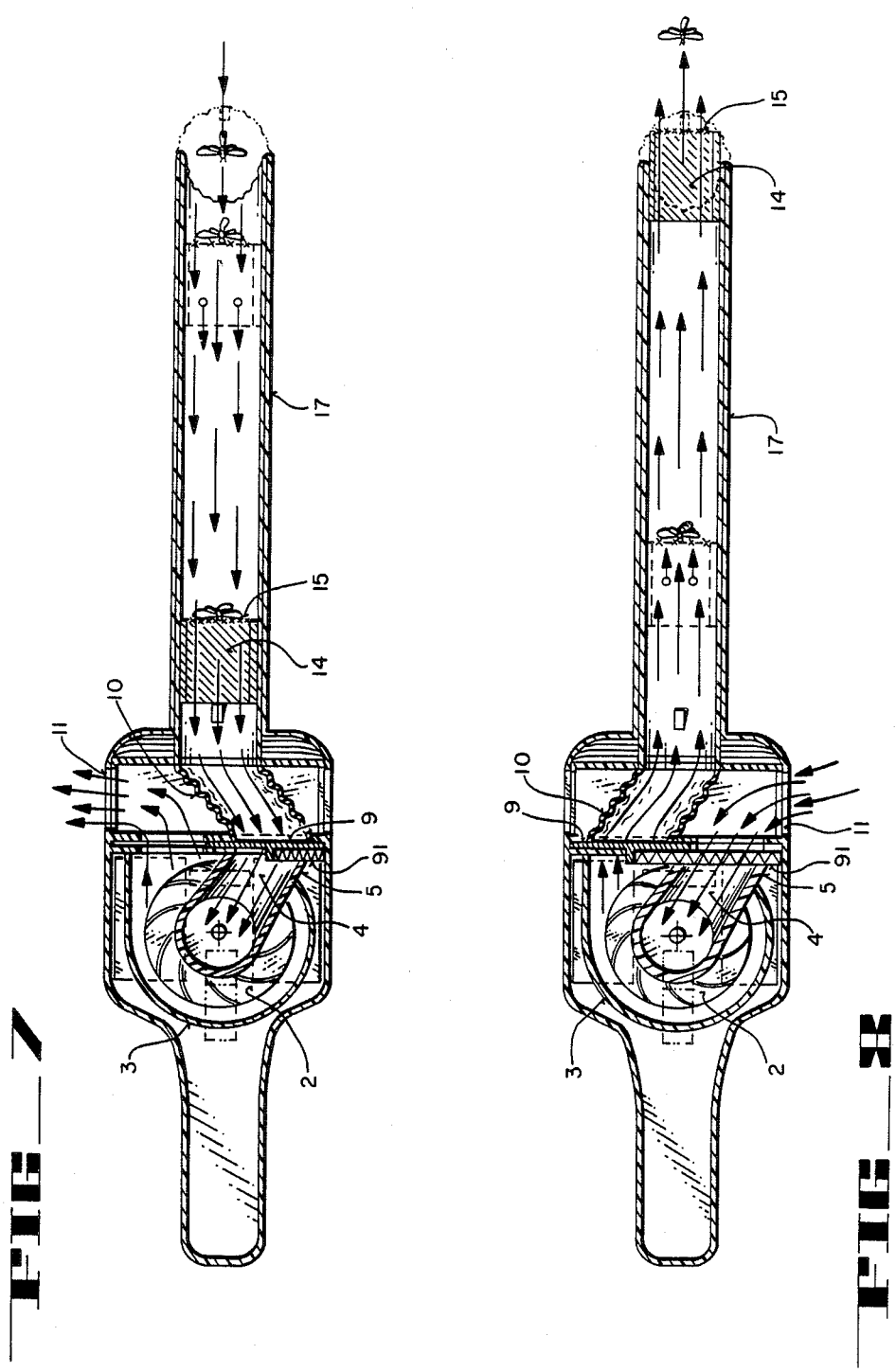

APPARATUS FOR THE COLLECTION AND DISPOSAL OF INSECTS

BACKGROUND OF THE INVENTION

1. Field of the Invention

This invention relates to apparatus for collecting dirt and other solid matter, in general, and insects in particular.

2. Introduction to the Invention

Vacuum cleaners and other forms of powered collection apparatus are well known. They may be powered by line voltage, or by rechargeable batteries, or by an internal combustion engine, and may be used for collecting dirt, insects and a wide variety of other solid and liquid objects and materials. In such apparatus the motor draws air through a collection opening which is placed near the material to be collected; the air then passes through a screen, filter or other receptor which retains the solid material entrained in the air; and finally the cleaned air is exhausted. The receptor can be of the disposable type, in which case it can be removed and thrown away with the solid material retained in it or on it, or the receptor can be of the re-usable type, in which case it can be removed, cleaned and replaced. Reference may be made for example to U.S. Pat. Nos. 4,573,235, 4,451,951, 4,449,319, 4,290,165, 4,209,875, 4,175,352, 4,074,458, 4,011,624, 3,683,446, 3,619,851, 3,599,213, 3,513,500, 3,238,556, 3,477,087, 3,196,577, 3,214,861, 2,340,944, 1,517,131, 1,313,203 and 1,029,972, the entire disclosures of which are incorporated herein by reference.

SUMMARY OF THE INVENTION

The need to use a disposable receptor, or alternatively to clean a reuseable receptor, is a serious disadvantage. This is particularly true if the apparatus is used to collect insects and consequently the user must handle the receptor containing the insects in order to dispose of them. Most people consider the handling of such a receptor very unpleasant, even a disposable receptor, let alone a reusable one that must be removed, cleaned and replaced. And many find it difficult even to contemplate the handling of a receptor containing insects considering the possibility that some of the insects may still be alive. Even when the collected material is less offensive, there is hardly anyone who would not prefer to leave the task of cleaning the receptor to someone else.

The present invention provides a solution to this problem. We have realized that if a screen or other receptor can be moved rapidly from a first position which is within a housing appropriate for collection to a second position which is appropriate for disposal, and can be brought to an abrupt stop in the second position, this will dislodge any insects etc. retained on the receptor. When the receptor is in the second position, it can be wholly or partially within the housing, preferably close to the collection opening, so that the insects are ejected through the collection opening; alternatively it can be wholly outside the housing, but preferably still connected to the housing by a rigid or flexible member. As a result, the receptor will rarely, if ever, need to be cleaned. In this way, the user can collect an insect at one location (e.g. inside a house) and can then move to a different location to eject the insect (e.g. outside the house). In a modification of this principle, the receptor is removably mounted on a carriage which moves within the housing and is brought to an abrupt stop in the second position, thus dislodging the receptor, with the insect(s) retained thereon.

We have also realized that if a user can choose whether air is sucked into the opening of the collection apparatus or is blown out of it, then this too will enable an insect to be collected at one location and disposed of at another location. This expedient can be used without the movable receptor, but is preferably used in conjunction with the movable receptor.

The invention can be embodied in an attachment for a conventional hand-held electrical vacuum cleaner (the attachment being used in place of the conventional nozzle and collection unit), or in an apparatus having its own power unit.

In one aspect the present invention provides an attachment for modifying a hand-held electric vacuum cleaner so that it is suitable for the collection and disposal of insects, the vacuum cleaner being of the type which comprises (1) a power unit comprising
  (a) an electric motor,
  (b) a fan which is driven by the motor, and
  (c) a switch for operating the motor;
(2) a collection unit which is separably connected to the power unit and which comprises a housing having a first open end and a second open end, the first open end being fitted to the power unit;

whereby operation of the motor causes air to be drawn through the collection unit so that solid matter adjacent the second open end is drawn through the second open end and collected in the collection unit;

said attachment being connectable to the power unit in place of the collection unit and comprising (a) a housing having a rear open end and a front open end, the rear open end being connectable to the power unit,
(b) a carriage which is movable between a rear position and a front position, the rear position being within the housing and relatively close to the rear open end and a front position which is relatively close to the front open end, and
(c) a receptor which
  (i) is mounted on the carriage and
  (ii) is such that, when it is mounted on the carriage, insects entrained by air drawn through the housing from the front open end to the rear open end are retained by the receptor, whereby, when the attachment is connected to the power unit of the vacuum cleaner, the resulting modified vacuum cleaner can be used to collect insects by operating the motor with the carriage in the rear position, and insects thus retained by the receptor can thereafter be disposed of by moving the carriage from the rear position to the front position so that the carriage comes to an abrupt stop in the front position, thus removing the insects from the carriage.

In another aspect, the present invention provides an integral apparatus for the collection and disposal of insects which comprises;

(a) a housing having a front open end for the collection of insects,
(b) a carriage which is movable between a rear position within the housing relatively remote from the front open end and a front position relatively close to the front open end;
(c) a receptor which
  (i) is mounted on the carriage, and (ii) is such that insects entrained by air drawn through the front open end into the housing are retained by the receptor;

(d) a motor; and (e) a fan which can be driven by the motor and which, when driven by the motor, causes air to move through the front open end of the housing;

whereby the apparatus can be used to collect insects by operating the motor so that air is drawn into the housing through the front open end while the carriage is in the rear position, and insects thus retained on the receptor can thereafter be disposed of by moving the carriage from the rear position to the front position so that the carriage comes to an abrupt stop in the front position, thus dislodging the insects from the carriage.

In another aspect, the present invention provides an integral apparatus for the collection and disposal of insects which comprises (1) a housing comprising a front open end for collecting insects;

(2) a motor;

(3) a fan which can be driven by the motor and which, when driven by the motor, causes air to move into or out of the housing through the front open end;

(4) direction means for reversing the direction in which air moved by the air-moving means moves through the front open end; and (5) an air-permeable receptor which (a) is mounted within the housing so that air which is moved through the front open end by the fan is also moved through the receptor, and (b) is such that insects entrained by air moving into the front open end are retained by the receptor, when air is moved by the fan out of the front open end, insects retained by the receptor are disposed of through the front open end.

BRIEF DESCRIPTION OF THE DRAWING

The invention is illustrated by the accompanying drawing, in which

FIGS. 1, 3 and 5 are side views in cross-section of first, second and third apparatuses of the invention as they are collecting insects;

FIGS. 2, 4 and 6 are side views in cross-section of the apparatuses of FIGS. 1, 3 and 5 as they are disposing of insects; and FIGS. 7 and 8 are top views in cross-section of FIGS. 5 and 6 respectively.

DETAILED DESCRIPTION OF THE INVENTION

When the invention is in the form of an attachment for an existing vacuum cleaner, it must of course incorporate some means for connecting it to the existing power unit. Preferably the attachment is connectable to the power unit in a removable fashion, so that it can be used interchangeably with the conventional collection unit. Preferably the connecting means on the attachment is the same as that on the conventional unit, e.g. one or more projections and/or recesses which engage corresponding recesses and projections on the power unit, at least one of the projections being movable to secure or release the attachment. Similarly, when the invention is in the form of an integral apparatus, it can be in the form of two units which can be separably connected to each other, the first unit comprising the motor and the fan (the term "fan" being used herein to include any air-moving means), and the second unit containing the receptor.

When, as is preferred, the receptor is mounted on a movable carriage, preferably at least a part of the carriage remains within the housing when the carriage is in the front position. However, the invention includes the possibility that the carriage is completely outside the housing when it is in the front position; in that case, the carriage is preferably connected by a rigid or flexible member, e.g. a cord, to the housing so that it can more easily be replaced in the rear position. In one embodiment, the carriage can move freely, preferably along a straight line, between the rear and front positions. The carriage can for example slide and/or roll on slides, tracks, wheels, ball bearings or the like attached to the carriage or the housing or both. Thus in the absence of other forces, e.g. the air pressure created by the fan, the carriage moves freely under gravitational forces to the front or the rear position, whichever is lower. Preferably, however, when the motor is switched on so that air is drawn into the housing through the front end, the carriage is sufficiently light in weight that it is driven to the rear position by the air pressure (or remains in the rear position), whatever the orientation of the apparatus. In this embodiment, if the direction of air flow cannot be reversed, a collected insect can be retained so long as the carriage is in the rear position (preferably with the motor on) and can be ejected by switching off the motor and moving the apparatus, e.g. by a quick movement of the user's arm or wrist, so that the carriage moves rapidly from the rear to the front position. Although it is desirable, it is not generally necessary to wait for the air flow to cease entirely before ejecting the insect, since the centrifugal forces which can be generated by the user's movement are so great. If the direction of air flow can be reversed, the same method can be used to eject the insect, after ceasing or reversing the direction of the air flow, or reversal of the air flow can alone be sufficient to move the carriage rapidly from the rear to the front position and eject the insect.

In another embodiment, the apparatus can comprise other means for assisting movement of the carriage from the rear to the front position. For example the apparatus can comprise (a) a resilient member (e.g. a metal spring or a member composed of a natural or synthetic rubber of other elastomer) which is releasably held in a resiliently deformed state when the receptor is in the rear position, and which, when released, urges the receptor towards the front position; and (b) means for resiliently deforming the resilient member and for releasably holding it in the deformed state. The means (b) can be one which is manually operated by the user so that the carriage is in the rear position before the collection device is used to collect an insect and so that the resilient member is released when the insect is to be ejected. Alternatively, it can be one which is automatically operated to move the carriage to the rear position when the collection device is first switched on, and is released manually or, if the direction of air flow can be reversed, is released automatically when the air flow is reversed.

The size and weight of the carriage and the receptor, the movement of the user's arm and/or the reversal of the air flow, and the distance between the rear and front positions, coupled with the effect of any resilient member as described, should be such that when the carriage is moved from the rear position to the front position, it reaches a speed such that, when it is brought to a sudden stop in the front position, any insect retained on the receptor is removed from the apparatus. The screen or other receptor is preferably mounted on the carriage so that it remains secured thereto during the collection and disposal process, in which case the insects become dislodged from the receptor when the carriage is brought to an abrupt stop. The receptor should, therefore, be such that the insects can readily be removed therefrom; it may for example be coated with a release agent, e.g. polytetrafluoroethylene, for this purpose. The apparatus is preferably constructed so that the user can see whether the insects have indeed been retained by the receptor and/or dislodged from the receptor. For example, at least part of the receptor can be outside the housing when the carriage is in the front position, and/or part of the housing can be constructed of transparent material, e.g. a transparent plastic. In another embodiment, the receptor is a disposable one which is mounted on the carriage so that it becomes dislodged from the carriage when the carriage is brought to an abrupt stop; in this case, the insects need not be, and preferably are not, removed from the receptor, which can therefore be such that an insect which is once retained by the receptor will remain stuck to, or trapped by, the receptor.

The distance between the rear and front positions is preferably at least 2 inches, particularly at least 4 inches. When the carriage is moved by centrifugal force generated by movement of the user's arm, we have found a distance of 4 to 8 inches to be satisfactory. When a resilient member is used, a shorter distance, e.g. 2 to 6 inches, is usually appropriate. When reversal of the direction of air flow is relied on to move the carriage, a longer distance, e.g. 6 to 10 inches, is usually appropriate.

The precise construction of the receptor will depend upon the expected use of the device. Particularly for the collection of common insects, we prefer to use a flat screen having apertures therein having a maximum dimension of 0.02 to 0.05 inch. However, the invention includes any type of receptor, including for example a receptor which is composed of flexible material and which can change its shape, e.g. so that it moves between the rear and front positions.

That part of the housing within which the receptor moves can be of any appropriate cross-section, e.g. round. In designing the apparatus, in particular the housing and the carriage, care should be taken to optimize the air flow, to avoid crevices or projections which an insect can cling onto in order to prevent its easy ejection and to prevent insects being crushed or trapped by movement of the carriage.

The front open end of the housing is preferably shaped so that air can be drawn through the housing even when the front end is positioned as closely as possible to a flat surface. Thus the periphery of the front open end can be crenellated, corrugated, castellated or provided with small holes. The front open end may also be formed of material which is resiliently deformable, so that it will conform to a surface against which it is pressed, to assist in exerting the maximum suction on an insect to be collected from the surface. The front open end preferably has a periphery which lies in a plane at an angle, e.g. of 30° to 60°, to the axis of the apparatus, so that the front open end can easily be placed flat against a wall above the user's shoulder.

The motor which is used in the apparatus of the invention can be of any kind, but is preferably an electrical motor, particularly one which is powered by rechargeable batteries mounted within the power housing. The motor drives a fan or other air-moving means, as is well known to those skilled in the art.

When the apparatus includes means for changing the direction in which air is moved through the housing, this can be achieved by changing the direction in which the motor turns, or by coupling the motor to different air-moving means, or by changing the position of one or more valves, e.g. gate valves, and/or one or more adjustable air passageways which may for example be composed of flexible elastomeric material. The design of this part of the apparatus will present no difficulties to those skilled in such matters, having regard to their own knowledge and the disclosure herein.

When the apparatus includes means for changing the direction in which air is moved through the housing, in order to ensure that inserts retained on the receptor are not accidentally ejected if the apparatus is switched off without being emptied, the apparatus may comprise means for ensuring that each time the fan is first operated, it moves air into the housing. When such apparatus also comprises a resilient member as described above, then it may also comprise means for ensuring that if the receptor is not already in the rear position, (i) the receptor is moved into the rear position and (ii) the resilient member is resiliently deformed and is releasably held in the deformed state.

Referring now to the drawings, the Figures illustrate devices of the invention which are designed for the collection and disposal of common insects and which are modified versions of a commercially available hand-held, battery-powered vacuum cleaner (namely a "Dust-Buster" sold by Black and Decker). Any of the other commercially available hand-held, battery-powered vacuum cleaners could have been used. In all of the Figures, the vacuum cleaner has been modified by replacing the conventional filter bag and housing by a tube which has an internal diameter of about 1.5 inches and a length of about 14 inches and within which slides a carriage carrying a nylon mesh screen made by stretching a nylon stocking over the carriage. In FIGS. 5 to 8, the power unit has also been modified by the addition of direction means for reversing the direction in which air flows through the tube.

In each of the Figures, there is a motor 1 which drives a fan 2 within a fan housing 3 and thus creates a vacuum in vacuum chamber 4 defined by vacuum chamber housing 5. The motor 1 is connected through switch 8 to rechargeable batteries 6 which can be recharged via battery recharge inlet 7 (shown in FIGS. 5 and 6 only). Tube 17 is detachably secured to the remainder of the apparatus by fixed attachment tab 12 and depressible tab 13. Positioned within the tube 17 is a carriage 14 on which is mounted screen 15. The carriage 14 can slide between a rear position shown in FIGS. 1, 3, 5 and 7 and a front position shown in FIGS. 2, 4, 6 and 8. In FIGS. 1 to 4, the open end of the tube 17 is defined by a resiliently deformable portion 171 having a castellated and apertured periphery. In FIGS. 5 to 8, the carriage has a greater length than in FIGS. 1 to 4, and the tube has an angled end, so that most of the screen is outside the housing when the carriage is in the front position.

FIGS. 1 and 2 show the simplest embodiment of the invention. When the motor is switched on, the vacuum thus created draws the carriage 14 into the rear position shown in FIG. 1 and retains insects drawn through the open end of tube 17 against the screen 15. When the motor is turned off, and the apparatus is moved rapidly in the direction shown by the arrow between FIGS. 1 and 2, the centrifugal force thus generated moves the carriage rapidly into the front position shown in FIG. 2 where the carriage is brought to an abrupt stop, thus ejecting the insects which have collected on the screen 15. Although not shown, the means which brings the carriage to an abrupt stop could be one or more screws which would hold the deformable portion 171 in place. This would enable the portion 171 and the carriage to be easily removed, e.g. for cleaning, or replacement, if either ever became necessary.

In a simple modification of FIGS. 1 and 2, a tab is attached to the carriage and projects through a slot in the tube 17, thus enabling the carriage to be moved manually between the rear and front positions.

FIGS. 3 and 4 show an apparatus which is similar to that in FIGS. 1 and 2 but which also comprises a spring 19 which biases the carriage to the front position; a tab 16 which is secured to the carriage and which projects through a slot in the tube 17 so that the carriage can be moved to the rear position, thus compressing the spring 19; and a carriage control lever 18 which releasably maintains the carriage in the rear position. In operation of the apparatus of FIG. 2, the carriage is set in the rear position, preferably before the motor is switched on, and after the insects have been collected, the lever 18 is pressed, preferably after the motor has been switched off, thus releasing the spring, which forces the carriage rapidly towards the front position, where it is brought to an abrupt stop.

FIGS. 5 to 8 show an apparatus similar to that shown in FIGS. 1 and 2 but which also contains means for reversing the direction of air flow in the tube 17. Thus a lever 9 controls the position of a flexible tube 10 which communicates at one end with the tube 17 and at the other end, depending upon the position of the lever 9, either with the vacuum chamber 41 (in the vacuum or "collection" mode shown in FIGS. 5 and 7) or with the impeller housing (in the blow or "disposal" mode shown in FIGS. 6 and 8). A spring 91 biases the lever 9 to the vacuum position, so that unless the user holds the lever in the blow position, air is drawn into the housing when the motor is switched on. Vents 11 are provided in the housing for the expulsion of air in the vacuum mode and for the entry of air in the blow mode. In operation of the apparatus, with the lever 9 in the position shown in FIGS. 5 and 7, the motor is switched on. The vacuum created in the tube 17 moves the carriage 14 to the rear position (unless, of course, it is already there) and any insects near the open end of the tube are drawn into the tube and retained on the screen 15. After collecting one or more insects in this way, the user moves to some place where he or she wishes to dispose of the insects, and then holds the lever 9 to the position shown in FIGS. 6 and 8. As a result air is blown down the tube, driving the carriage from the rear position to the front position, where it comes to an abrupt stop. The insects are dislodged from the screen and ejected from the apparatus.

We claim:

1. An attachment for modifying a hand-held electric vacuum cleaner so that it is suitable for the collection and disposal of insects, the vacuum cleaner being of the type which comprises (1) a power unit comprising
  (a) an electric motor,
  (b) a fan which is driven by the motor, and
  (c) a switch for operating the motor; and
(2) a collection unit which is separably connected to the power unit and which comprises a housing having a first open end and a second open end, the first open end being fitted to the power unit; whereby operation of the motor causes air to be drawn through the collection unit so that solid matter adjacent the second open end is drawn through the second open end and collected in the collection unit;

said attachment being connectable to the power unit in place of the collection unit and comprising (a) a housing having a rear open end and a front open end, the rear open end being connectable to the power unit,
(b) a carriage which is movable between a rear position and a front position, the rear position being within the housing and relatively close to the rear open end and a front position which is relatively close to the front open end, and
(c) a receptor which
  (i) is mounted on the carriage and
  (ii) is such that, when it is mounted on the carriage, insects entrained by air drawn through the housing from the front open end to the rear open end are retained by the receptor, whereby, when the attachment is connected to the power unit of the vacuum cleaner, the resulting modified vacuum cleaner can be used to collect insects by operating the motor with the carriage in the rear position, and insects thus retained by the receptor can thereafter be disposed of by moving the carriage from the rear position to the front position so that the carriage comes to an abrupt stop in the front position, thus removing the insects from the carriage.

2. An attachment according to claim 1 wherein the receptor is secured to the carriage and at least part of the carriage remains within the housing when the carriage is in the front position.

3. An attachment according to claim 2 wherein at least part of the receptor is outside the housing when the carriage is in the front position.

4. An attachment according to claim 2 wherein the carriage moves freely within the housing along a straight line between the rear and front positions, so that, when the attachment is not connected to the power unit, the carriage is in the rear position when the attachment is held with the front open end vertically above the rear open end and the carriage is in the front position when the attachment is held with the rear open end vertically above the front open end.

5. An attachment according to claim 2 which further comprises (a) a resilient member which is releasably held in a resiliently deformed state when the carriage is in the rear position and which, when released, urges the carriage towards the front position, and
(b) means for resiliently deforming the resilient member and for releasably holding it in the deformed state.

6. An attachment according to claim 2, wherein the receptor comprises a screen which will retain insects entrained by air moving through the screen, and the apertures in the screen have a maximum dimension of 0.02 to 0.05 inch.

7. An attachment according to claim 2 wherein the front open end of the housing is shaped so that air can be drawn through the housing even when the front end is positioned as closely as possible against a flat surface.

8. An attachment according to claim 2 wherein the front open end of the housing is deformable so that is will conform to a surface against which it is pressed.

9. An attachment according to claim 2 wherein the carriage moves a distance of at least 4 inches between the rear and front positions.

10. An integral apparatus for the collection and disposal of insects which comprises;
  (a) a housing having a front open end for the collection of insects,
  (b) a carriage which is movable between a rear position within the housing relatively remote from the front open end and a front position relatively close to the front open end;
  (c) a receptor which
    (i) is mounted on the carriage, and
    (ii) is such that insects entrained by air drawn through the front open end into the housing are retained by the receptor;
  (d) a motor; and
  (e) a fan which can be driven by the motor and which, when driven by the motor, causes air to move through the front open end of the housing;
whereby the apparatus can be used to collect insects by operating the motor so that air is drawn into the housing through the front open end while the carriage is in the rear position, and insects thus retained on the receptor can thereafter be disposed of by moving the carriage from the rear position to the front position so that the carriage comes to an abrupt stop in the front position, thus dislodging the insects from the carriage.

11. Apparatus according to claim 10 wherein the receptor is secured to the carriage and at least part of the carriage remains within the housing when the carriage is in the front position.

12. Apparatus according to claim 11 wherein at least part of the receptor is outside the housing when the carriage is in the front position.

13. Apparatus according to claim 11 wherein the carriage moves within the housing so that when the apparatus is held still, in any position, and the motor is operated so that air is drawn into the housing through the front open end, the carriage is held in the rear position.

14. Apparatus according to claim 11 which comprises
  (a) a resilient member which is releasably held in a resiliently deformed state when the carriage is in the rear position and which, when released, urges the carriage towards the front position, and
  (b) means for resiliently deforming the resilient member and for releasably holding it in the deformed state.

15. Apparatus according to claim 11 wherein the receptor comprises a screen which will retain insects entrained by air moving through the screen and which comprises apertures having a maximum dimension of 0.02 to 0.05 inch.

16. Apparatus according to claim 11 which further comprises direction means for reversing the direction in which air moved by the fan moves through the front open end of the housing, whereby, when air is moved out of the front open end by the fan, movement of the carriage from the rear position to the front position is caused or assisted.

17. Apparatus according to claim 16 wherein the direction means comprises an adjustable air passageway.

18. Apparatus according to claim 16 which comprises means for ensuring that each time the fan is first operated by the motor, it moves air into the housing through the front open end.

19. Hand-held apparatus according to claim 10 wherein the motor is an electric motor which is operated by rechargeable batteries.

* * * * *